Feb. 15, 1949.   M. L. CLOPTON   2,461,521
SENSITIVE ELEMENT FOR SPACE SPEED, TRACK
AND ANGLE OF ATTACK INDICATORS
Filed Sept. 19, 1947   2 Sheets-Sheet 1
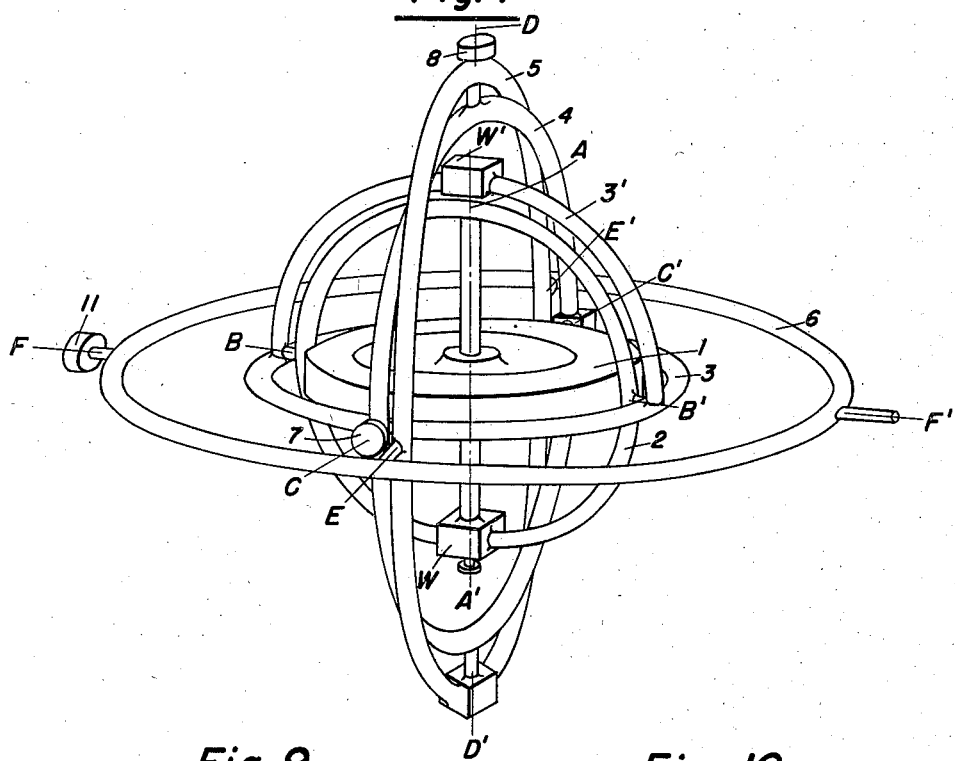
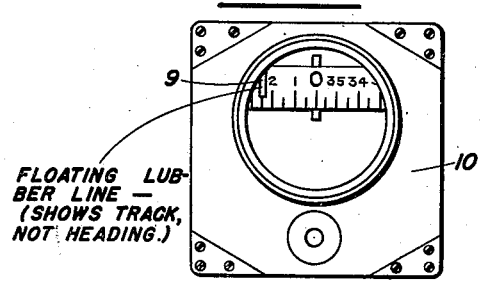
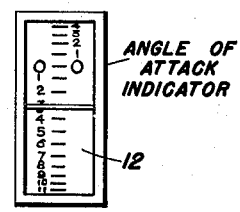
Inventor
MORTIMER L. CLOPTON
By F. J. Schmitt
Attorney Feb. 15, 1949. M. L. CLOPTON 2,461,521
SENSITIVE ELEMENT FOR SPACE SPEED, TRACK
AND ANGLE OF ATTACK INDICATORS
Filed Sept. 19, 1947 2 Sheets-Sheet 2

Inventor
MORTIMER L. CLOPTON

Patented Feb. 15, 1949

2,461,521

UNITED STATES PATENT OFFICE 2,461,521

SENSITIVE ELEMENT FOR SPACE SPEED, TRACK AND ANGLE OF ATTACK INDICATORS

Mortimer L. Clopton, South Pasadena, Calif.

Application September 19, 1947, Serial No. 775,093

6 Claims. (Cl. 74—5.6)

(Granted under the act of March 3, 1883, as amended April 30, 1928; 370 O. G. 757)

This invention relates to aircraft instruments, and more specifically to instruments for indicating space speed, track and angle of attack.

The object of this invention is to provide a space speed, track and angle of attack indicator which indicates these values continuously and directly, is independent of any drift sights, plotting boards, celestial navigation, or electronic navigation aids, is not affected by gravity or centrifugal forces due to directional changes in flight path, and is not limited by conditions of weather, visibility, radio-silence and similar factors.

Another object is to construct a universally mounted constant-speed gyroscopic instrument, wherein the gimbal in which the gyrostat is mounted is unbalanced about one axis normal to its axis of rotation, but is so counterpoised that it is balanced about all other axes, whereby any acceleration of the instrument will move said axis of unbalance into a plane normal to the direction of the acceleration and will produce a force tending to rotate said gyrostat about said axis of unbalance and cause it to precess about the direction of acceleration an amount proportional to the acceleration, the direction of precession being dependent on the direction of acceleration, thus providing a continuous integrating means to indicate ground speed by means of a Selsyn on said precession axis controlling a slave Selsyn on a ground speed indicator.

Another object is to provide a Selsyn on the above defined instrument responsive to turning of the axis of precession of said gyrostat gimbal relative to the lubber line or fore and aft vertical plane of the universal mounting, to control a slave Selsyn indicating the track or angle of drift.

Another object is to include in the above instrument a Selsyn responsive to turning of the axis of precession of said gyrostat gimbal relative to the lateral plane of the universal mounting parallel to the chord line of the aircraft wings, to control a slave Selsyn indicating the angle of attack.

Other and more specific objects will appear in the following detailed description of one form of construction which may be employed in building an instrument in accordance with the present invention, having reference to the accompanying drawings, wherein:

Fig. 1 is a diagrammatic perspective illustration of the instrument;

Fig. 9 shows a track indicator in the form of a floating lubber line mounted in the directional gyro and operated by a slave Selsyn in response to a Selsyn on the gyroscopic instrument of Fig. 1; and Fig. 10 shows an angle of attack indicator similarly operated in response to the corresponding Selsyn on the instrument.

Figure 4:
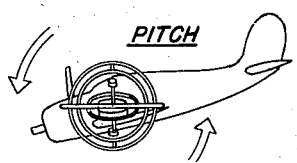
Figs. 2, 3 and 4 are diagrammatic illustrations of a plane equipped with the instrument, showing how a change in attitude alone of the plane will not affect the operation of the instrument in the absence of acceleration.

The subject invention is predicated upon the following premises:

a. Every flight begins with the aircraft at rest in the take-off position, and ends with the aircraft at rest after landing.

b. Between these two static conditions, changes in speed of the aircraft are caused by (1) manipulation of the controls including the throttle, ailerons, rudder, trim-tabs, flaps, retractible gear, etc., and (2) by the behavior of the "ocean of air" which sustains the aircraft, including wind, updrafts, downdrafts, and the like.

c. Every change in speed of the aircraft, from whatever cause, involves either (1) acceleration or (2) deceleration.

d. An instrument which will integrate acceleration and deceleration, i. e., keep a running account by addition of acceleration and subtraction of deceleration as they occur, will give a correct reading of speed at all times. In this connection, stress is laid upon the fact that the thing to be integrated is not the rate of acceleration or deceleration, but rather the total quantities of acceleration and deceleration, whether they occur at rapid rates or at almost imperceptibly gentle rates.

e. The direction of acceleration and deceleration of the aircraft is at all times in alignment with flight path.

f. An instrument which will automatically align itself with the aircraft's acceleration or deceleration will, therefore, also be aligned with flight path.

g. If means are provided for reading the alignment of such instrument with relationship to the directional gyro in the airplane, the aviator will be enabled to read the direction of his track directly, and will be supplied with an automatic and continuous solution of the "wind-triangle."

h. The relative wind, i. e., the direction from which the air strikes the wings of the aircraft, is always aligned with flight-path.

i. An instrument which will automatically align itself with the aircraft's acceleration and deceleration, and therefore with flight path, will consequently be aligned with the relative wind.

j. If means are provided for reading the angle formed by the alignment of such instrument with relationship to the chord-line of the aircraft's wings, the aviator will be enabled to read the angle of attack at which the wings are encountering the air.

The subject invention is designed to accomplish the foregoing results by taking advantage of the following natural laws:

a. A gyrostat remains stable in space until an angular force is encountered, tending to deflect the axis about which the gyrostat is spinning.

b. When such deflective or angular force is encountered, the gyrostat does not give way to the force, but instantly precesses in a plane at right angles to such force.

c. If the direction of such angular force is reversed, the direction of precession is reversed, but the plane in which precession occurs is unchanged, since the same plane is at ninety degrees to both the original force and the reverse thereof.

d. Since the plane in which precession occurs is always at right angles to the deflective or angular force, the axis about which precession occurs will always align itself with such deflective or angular force.

e. If the rate of spin of the gyrostat is constant, its rate of precession is proportional to the deflective or angular force applied.

f. The force with which the gyrostat precesses is the same as the deflective or angular force applied, minus friction.

g. If the deflective or angular force is caused to rotate with the precession, the latter becomes continuous. When the force ceases, the characteristic of stability again becomes paramount, and precession instantly ceases. The duration of precession is, therefore, exactly concurrent with the duration of the deflective or angular force.

In the light of the foregoing premises and natural laws, subject invention is so conceived that its sensitive element is a gyrostat which a. Is caused to spin at a constant speed.

b. Is so weighted that it is unbalanced about one axis, but is so counterpoised that it is balanced about all other axes.

c. Is so suspended that the forces of acceleration and deceleration incidental to changes in speed of the aircraft, acting upon the inertia of the weight unbalancing the gyrostat about its one unbalanced axis, will cause the gyrostat to precess about another axis a certain number of revolutions-in-precession for each knot of speed gained or lost during such changes in speed.

d. Is so suspended that the gyrostat is free from the influence of any forces generated solely by changes in the attitude of the aircraft.

e. Is so suspended that the axis about which precession occurs is free to align itself with the direction in which acceleration or deceleration occurs, and thus to align itself with the flight-path of the aircraft.

Referring to the drawings, Fig. 1 shows: a gyrostat, 1, mounted in a gimbal, 2, to spin at a constant speed about axis A—A'. It is believed that constant speed of spin may be better obtained by electric than by pneumatic power for this gyrostat. Gimbal 2 is mounted within gimbal 3 on axis B—B'. Gimbal 3 is mounted within gimbal 4 on axis C—C'. Gimbal 4 is mounted within gimbal 5 on axis D—D'. Gimbal 5 is mounted within gimbal 6 on axis E—E'. Gimbal 6 is mounted within the case of the instrument on axis F—F'. Axis F—F' is parallel to the lateral or pitch axis of the aircraft.

Gimbal 2 is weighted at one end of the axis A—A' by weight W, so that the gyrostat is unbalanced about axis B—B'. Gimbal 3 is crossed by arch 3', supporting weight W'. This arch 3' and weight W' exactly counterpoise the gyrostat 1, the gimbal 2 and weight W, so that balance is restored about axis C—C' and about all other axes except B—B'. Being thus counterpoised, this unit may precess freely about axis C—C'.

Prior to take-off, the gyrostat is started and allowed to attain its constant speed of spin. Acceleration of the aircraft during the take-off run and the climb will act in conjunction with the inertia of weight W to produce an angular force tending to tilt gimbal 2 about axis B—B'. However, the gyrostat will not give way to this angular force, but will precess about axis C—C' at a rate proportionate to the angular force, exactly as long as acceleration continues, and with a force equal to the force of acceleration, minus friction. When acceleration ceases, the characteristic of stability will again become paramount, precession will cease, and the gyrostat will remain in the position in which it comes to rest until a further change in speed of the aircraft occurs, and acceleration again acts upon the inertia of weight W to cause further precession, or deceleration acts to cause counterprecession. For example, let us assume that the rate of spin of the gyrostat and the inertia of weight W are such that, for each change of speed of the aircraft amounting to one knot, the gyrostat will make ten revolutions-in-precession. Then if the aircraft takes off and gains speed until it is making one-hundred knots, the gyrostat will, during the period of acceleration, make one thousand revolutions in precession. Let us further assume that the aircraft then turns into a thirty-knot wind, with a resultant reduction in actual ground speed from one-hundred to seventy knots. The deceleration will cause the gyrostat to make three-hundred counter-revolutions-in-precession. Then, if the throttle is advanced to add ten knots speed, the resulting acceleration will cause one-hundred revolutions-in-precession, and so on throughout the flight.

A master Selsyn motor 7 may be so mounted on gimbal 4 as to be activated by the precession and counter-precession of the gyrostat 1, gimbal 2, and gimbal 3, about axis C—C' and is counterbalanced by a weight at the other side of gimbal 4 on the axis C—C'. This master Selsyn motor 7 will control a slave Selsyn motor (not shown) activating the needle of the space-speed indicator on the instrument panel. Continuing the imaginary example assumed in the preceding paragraph, one-thousand revolutions-in-precession of the gyrostat from take-off until the one-hundred knot speed is attained will cause the indicator to advance to show one-hundred knots ground speed. Three-hundred counter-revolutions-in-precession of the gyrostat, when the thirty knot head-wind is encountered will cause the indicator to move back to show only seventy knots ground speed. One-hundred revolutions-in-precession when the throttle is advanced to add ten knots speed, will cause the indicator to advance again to eighty knots, and so on, throughout the flight.

Figure 2:
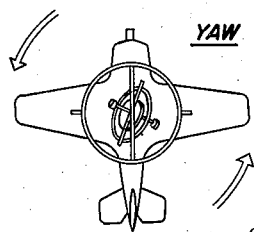
Figure 3:
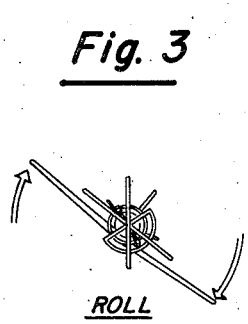

Figs. 2, 3 and 4 show how the gyrostat 1, gimbal 2, and gimbal 3 are insulated from forces generated solely by changes in the attitude of the aircraft. For the purpose of these three figures, it was assumed that the gyrostat has ceased precessing and has come to rest with axis A—A' between a horizontal and a vertical position, and with weight W at its upper end and weight W' at its lower end. Fig. 4 is a side elevation, Fig. 3 a rear elevation, and Fig. 2 a plan view of the instrument in the described position. Fig. 4 shows that the aircraft may pitch about axis F—F', without disturbing the gyrostat. Fig. 3 shows that the aircraft may roll about axis E—E' without disturbing the gyrostat. Fig. 2 shows that the aircraft may yaw about axis D—D' without disturbing the gyrostat.

Figures 5, 6, 7:
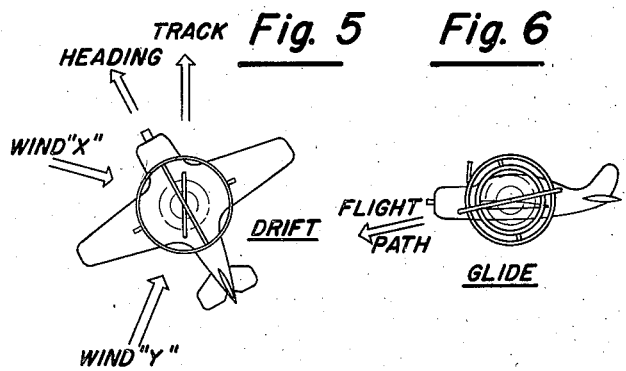
Fig. 5 shows how a change in wind may cause acceleration or deceleration without changing the track, where each wind causes the same angle of drift.
Fig. 6 shows how deceleration in a glide will measure the angle of attack by lining up the axis of precession with the flight path.
Fig. 7 shows the effect of a gliding turn with a little inward side slip or drift.

In Fig. 5, the gyrostat, gimbal 2, and gimbal 3 are shown precessing about axis C—C'. A strong cross-wind on the bow is shown as wind X. A strong cross-wind on the quarter is shown as wind Y. Either wind X, reducing the speed, or wind Y, increasing the speed of the aircraft, would cause right drift, so the flight path will be along the arrow marked "Track." Acceleration of the aircraft resulting from wind Y, or deceleration resulting from wind X, will be parallel to the arrow labelled "Track." For the reasons heretofore discussed, precession or counter-precession of the gyrostat, being in a plane at right-angles to the forces of acceleration or deceleration, will align axis C—C' with such forces, and therefore with the track of the aircraft, by swinging gimbal 4 about axis D—D'.

A master Selsyn motor 8 may be so mounted on gimbal 5 as to be activated by the movement of gimbal 4 about axis D—D' and is counterbalanced at the opposite side of gimbal 5 on the axis D—D'. This master Selsyn motor 8 will control a slave Selsyn motor (not shown) activating a floating lubber line 9 in the directional gyroscope 10. When gimbal 4 moves about axis D—D' to align itself with a flight path some twenty-four degrees (24°) to the right of the heading, as shown in Fig. 5, the floating lubber line will move left twenty-four degrees (24°), as shown in Fig. 9.

In Fig. 6, the gyrostat is shown in precession during a glide. Here the flight path is downward. Consequently, acceleration or deceleration is parallel to the arrow labelled "Flight path" and the precession or counter-precession of the gyrostat will align axis C—C' with such forces, therefore with the flight-path and the relative wind, by tipping gimbal 6 about axis F—F', as shown in Fig. 6.

A master Selsyn motor 11 may be so mounted as to be activated by the tipping of gimbal 6 about axis F—F'. This master Selsyn motor will control a slave Selsyn motor (not shown) activating an indicator 12 on the instrument panel showing the angle-of-attack at which the aircraft is flying. Such an instrument is sketched in Fig. 10. In the instrument, an angle of attack of three degrees (3°) is indicated. When the angle of attack increases, the drum will be caused to rotate upward so that the correct higher figure will appear behind the reference line. When the angle of attack decreases, the drum will be caused to rotate downward. The negative figures appearing above zero (0) are available to indicate negative angle of attack.

In Fig. 7, the behavior of the instrument is shown in a gliding turn, no-wind condition. It will be noted that the flight path is curving and down. The drawing shows precession occurring. In order to precess at right angles to the flight path, the gyrostat has tipped forward on axis F—F', to accommodate for the downward slope of the flight path and has adjusted itself about axis E—E' to accommodate for the turning of the flight path.

Figure 8:
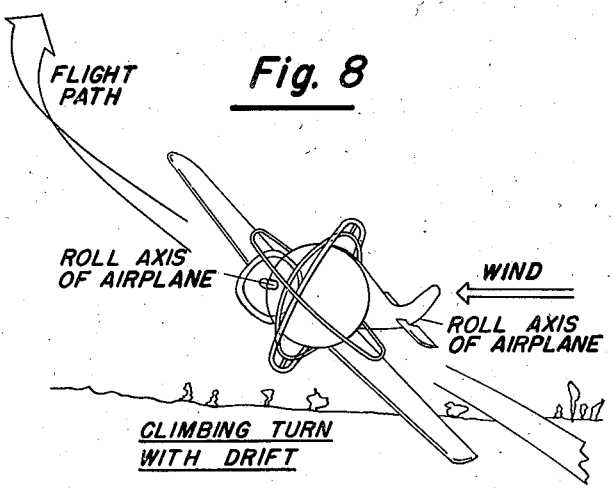
Fig. 8 shows the effect of a climbing turn with some outward drift.

In Fig. 8, the behavior of the instrument is shown in a climbing turn with drift. Again, the drawing shows precession occurring. This drawing shows how the instrument may adjust itself in three dimensions simultaneously, to accommodate for upward (or downward) curving flight turning flight, and drift. The roll axis of the aircraft has been indicated for reference purposes. In aligning axis C—C' with the flight path, it will be noted that the gyrostat has tipped upward about axis F—F', to align with the upward direction of flight, has tipped slightly out of the vertical about axis E—E' to accommodate the banking and turning flight, and has swung to starboard, about axis D—D', to align with the track of the aircraft which is drifting.

Consideration has been given to the accuracy of ground-speed indication during climbing or gliding flight. It is true that the speed indicated by subject instrument during climbing or gliding flight will be slightly higher than actual ground speed. However, such inaccuracy, even under extreme conditions, will be a matter of two or three percent (2% or 3%). Furthermore, such inaccuracy will not be carried over into level flight, but will automatically correct itself when level flight is resumed.

Since space-speed only slightly exceeds ground-speed in climbing or gliding flight, and since space-speed in level flight is the same as ground speed, subject instrument is, for all practical purposes, an accurate ground speed indicator.

Consideration has been given to the effects of gravity and of centrifugal force upon the functioning of subject instrument. Attention is invited to the fact that subject instrument does not rely upon the force of gravity for any of its functions. The suspension of gimbal 2 is such that whenever gravity exerts force on weight W, with axis C—C' in a horizontal position, either during precession or during a period of stability, an equal and opposite force is exerted by the arch 3 and counterpoise W'. During climbing or gliding flight, axis C—C' will, of course, be tipped from the horizontal. When the gyrostat is precessing, during gliding flight, the plane in which weight W and counterweight W' travel is tipped slightly from the vertical. When weight W passes the top and the bottom of its revolution in precession, the force of gravity will momentarily act upon it. But the effect of this momentary influence at the top of its revolution in precession will be exactly opposite to the momentary effect at the bottom of its revolution in precession, so that the two will cancel each other. That is to say, if the flight path is upward the momentary effect of gravity on weight W at the top of its revolution in precession will be the same as slight acceleration of the aircraft, but the momentary effect at the bottom of weight W's revolution in precession will be the same as slight deceleration. If the flight path is downward, the momentary effects would be reversed, but still would cancel each other. If, acceleration ceases with weight W in a position at the top or the bottom of its revolution in precession, the effect of gravity on weight W will act to cause precession through not more than a quarter of a revolution in precession, for the reason that as axis A—A' approaches the horizontal, the effect of gravity upon counterweight W' comes into opposition to the effect of gravity upon weight W and the force of gravity is neutralized again.

In view of the fact that the effects of centrifugal force acting upon an aircraft during turns, pull-outs and the like, is the same as added gravity, or additional g's, the same reasoning which is above set forth concerning the effect of gravity would equally apply to the effect of such centrifugal force.

Consideration has been given to the fact that curvature of the earth and the revolutions of the earth influence some gyroscopic instruments, such as the gyro-compass. The gyroscopic instruments in which such influences are appreciable, seek to utilize the gyroscope's stability, and sometimes seek to utilize the pull of gravity as well. But subject invention primarily utilizes the precessive characteristic of the gyro, rather than its stability, and is so conceived that the effects of gravity are neutralized. It is believed that subject instrument will almost constantly be subjected to forces of acceleration and deceleration, of varying intensities, so that it will never remain at rest long enough to be affected by the curvature or the rotation of the earth. Attention is invited to the fact that these forces do not affect all gyroscopic instruments. For instance, they do not affect the turn and bank indicator.

Consideration has been given to the effect of friction upon the functioning of subject invention. It is contemplated that all bearings should be ball or roller bearings, in order to reduce friction as much as possible. However, friction cannot be entirely eliminated. But, since damping devices are not employed, friction will not be a variable factor. It will be a practical constant. The speed of spin of the gyrostat will likewise be a constant. The inertia of weight W will likewise be a constant. Consequently, if friction is accounted for when the instrument is calibrated, then it will not thereafter interfere with the functioning of the instrument.

Consideration has been given to the necessity for supplying electrical current to the motor of the gyrostat and to the Selsyn motors. It is believed that this can be easily accomplished by means of collector rings.

Consideration has been given to the size, weight and location of the subject instrument. It is estimated that the sensitive element of subject instrument can be housed in a space comparable to that occupied by other gyroscopic instruments. It is estimated that the weight of all the gear described herein should not exceed five (5) pounds. In this connection, attention is invited to the fact that other navigational gear occupying as much or more space, and weighing as much or more, could be removed from the aircraft. The sensitive element of subject instrument can be located in any convenient place, for the reason that all of its functions are registered by remote instruments, through three (3) teams of Selsyn motors, the master Selsyns of which are indicated at 7, 8 and 11 in Fig. 1.

Refinements of design and obvious modifications in form and dimensions of parts may be made without departing from the spirit and scope of this invention, as defined in the appended claims.

The invention described herein may be manufactured and used by or for the Government of the United States of America for governmental purposes without the payment of any royalties thereon or therefor.

What is claimed is:

1. An aircraft instrument comprising a constant-speed gyrostat mounted in a gimbal ring having a pair of bearings normal to the axis of said gyrostat, a weight on said gimbal ring for unbalancing said gyrostat and gimbal ring about said bearings, a second gimbal ring for supporting said bearings and having a second pair of bearings normal thereto, a third gimbal ring for supporting said second pair of bearings and mounted for universal rotation in said aircraft, said second gimbal ring having a counterbalance to balance said gyrostat and first and second gimbal rings, about said second pair of bearings, whereby acceleration of the aircraft will cause said universally mounted third gimbal ring to aline said second pair of bearings with the direction of acceleration and will tend to move said weight about said first bearings and cause precession of said balanced assembly about said second bearings.

2. An aircraft instrument as defined in claim 1, wherein said universal mounting comprises a third pair of bearings on said third gimbal ring normally disposed relative to said second bearings, a fourth gimbal ring for supporting said third bearings and having a fourth pair of bearings normal thereto, and a fifth gimbal ring for supporting said fourth bearings and having a fifth pair of bearings normal thereto for lateral support in said aircraft.

3. An aircraft instrument as defined in claim 2, having a balanced master Selsyn for measuring the angle between the third and fourth gimbal rings and controlling a track indicator.

4. An aircraft instrument as defined in claim 2, having a balanced master Selsyn for integrating the angular displacement between the second and third gimbal rings and controlling a space speed indicator.

5. An aircraft instrument as defined in claim 2, having a balanced master Selsyn for measuring the angular displacement of said fifth gimbal ring from a plane parallel to the chord line of the aircraft wing and controlling an angle of attack indicator.

6. An aircraft instrument as defined in claim 5, having a second balanced master Selsyn for integrating the angular displacement between the second and third gimbal rings and controlling a space speed indicator, and having a third balanced master Selsyn for measuring the angle between said third and fourth gimbal rings and controlling a track indicator.

MORTIMER L. CLOPTON.

REFERENCES CITED

The following references are of record in the file of this patent:

UNITED STATES PATENTS

| Number | Name | Date |
|---|---|---|
| 1,692,412 | Koenig | Nov. 20, 1928 |
| 1,726,643 | Borresen | Sept. 3, 1929 |
| 1,932,210 | Glitscher | Oct. 24, 1933 |